US012067825B2

(12) United States Patent
Conroy et al.

(10) Patent No.: US 12,067,825 B2
(45) Date of Patent: Aug. 20, 2024

(54) UNIFIED ACCESS CONTROL SYSTEM

(71) Applicant: Universal City Studios LLC, Universal City, CA (US)

(72) Inventors: Brett J. Conroy, Orlando, FL (US);
Kyle P. Hanley, Orlando, FL (US);
Bonnie J. Spivey, Orlando, FL (US);
Mark J. Traynor, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 75 days.

(21) Appl. No.: 17/383,063

(22) Filed: Jul. 22, 2021

(65) Prior Publication Data

US 2021/0350651 A1 Nov. 11, 2021

Related U.S. Application Data

(62) Division of application No. 16/547,318, filed on Aug. 21, 2019, now Pat. No. 11,100,742.
(Continued)

(51) Int. Cl.
*G07C 9/37* (2020.01)
*G06F 21/32* (2013.01)
*G07C 9/38* (2020.01)

(52) U.S. Cl.
CPC ............... *G07C 9/37* (2020.01); *G06F 21/32* (2013.01); *G07C 9/38* (2020.01)

(58) Field of Classification Search
CPC ........ G07C 9/37; G07C 9/38; G07C 2011/02; G07C 9/27; G06F 21/32; G06F 7/08; G07B 11/00; G07B 15/02
(Continued)

(56) References Cited

U.S. PATENT DOCUMENTS 5,502,806 A 3/1996 Mahoney et al.
6,173,209 B1 1/2001 Laval et al.
(Continued)

FOREIGN PATENT DOCUMENTS

CN 1571973 A 1/2005
CN 105913521 A 8/2016
(Continued)

OTHER PUBLICATIONS

CN Office Action for Chinese Application No. 201980055014.4 Mailed Aug. 2, 2022.
(Continued)

*Primary Examiner* — Nam V Nguyen
(74) *Attorney, Agent, or Firm* — Fletcher Yoder, P.C.

(57) ABSTRACT

An amusement park access control system includes an amusement park area having an entrance. A unified access control device is positioned at the entrance and is configured to control guest access into the amusement park area. The unified access control device includes sensor modules and an access control module physically connected to one another to form a unified structure. The sensor modules scan the entrance to determine guest identification data. An access control computer system is communicatively coupled to the unified access control device and includes databases storing guest enrollment data and entitlement data associated with the guest enrollment data. The unified access control device identifies entitlements associated with the guest identification data based on a comparison between the guest identification data, the guest enrollment data, and the entitlement data, and controls guest access through the entrance based on the identified entitlements.

20 Claims, 6 Drawing Sheets

Related U.S. Application Data

(60) Provisional application No. 62/721,721, filed on Aug. 23, 2018.

(58) Field of Classification Search
USPC ............... 340/5.2, 5.21, 5.23, 5.27; 700/90; 715/839
See application file for complete search history.

(56) References Cited

U.S. PATENT DOCUMENTS

| | | | |
|---|---|---|---|
| 6,529,786 | B1 | 3/2003 | Sim |
| 6,539,101 | B1 | 3/2003 | Black |
| 6,690,673 | B1 | 2/2004 | Jarvis |
| 7,047,205 | B2* | 5/2006 | Hale ................. G06Q 10/02 |
| | | | 705/5 |
| 7,222,080 | B2 | 5/2007 | Hale et al. |
| 7,394,919 | B2 | 7/2008 | Rowe et al. |
| 8,082,165 | B2 | 12/2011 | Natsuyama et al. |
| 8,200,515 | B2* | 6/2012 | Natsuyama ....... G06Q 30/0207 |
| | | | 705/5 |
| 8,674,805 | B2 | 3/2014 | Charych |
| 8,779,889 | B2 | 7/2014 | Bayne et al. |
| 8,994,498 | B2 | 3/2015 | Agrafioti et al. |
| 9,038,896 | B2 | 5/2015 | Williams et al. |
| 9,363,249 | B2* | 6/2016 | Lambert ............. H04L 63/0442 |
| 9,680,871 | B2* | 6/2017 | Elley .................. H04L 63/20 |
| 10,062,234 | B2 | 8/2018 | Bayne et al. |
| 10,313,134 | B2* | 6/2019 | Smith ................. H04L 63/062 |
| 10,373,395 | B1 | 8/2019 | Harned et al. |
| 10,771,470 | B2* | 9/2020 | Warrick ................. G06F 21/31 |
| 11,100,742 | B2* | 8/2021 | Conroy ................. G07C 9/37 |
| 2002/0062236 | A1* | 5/2002 | Murashita ............ G06Q 10/02 |
| | | | 705/5 |
| 2002/0116235 | A1 | 8/2002 | Grimm et al. |
| 2005/0152551 | A1 | 7/2005 | Defreese et al. |
| 2007/0168390 | A1 | 7/2007 | Mardirossian |
| 2007/0194884 | A1* | 8/2007 | Didier ................. G06V 40/10 |
| | | | 340/5.82 |
| 2008/0080445 | A1* | 4/2008 | Bayne .................. G07C 11/00 |
| | | | 370/342 |
| 2009/0063205 | A1* | 3/2009 | Shibasaki ............. G06Q 10/02 |
| | | | 705/5 |
| 2010/0169378 | A1* | 7/2010 | Tinberg ............... G07C 9/37 |
| | | | 726/5 |
| 2013/0332509 | A1 | 12/2013 | Schwartz et al. |
| 2014/0111304 | A1 | 4/2014 | Hashim-Waris |
| 2016/0189149 | A1 | 6/2016 | MacLaurin et al. |
| 2017/0168390 | A1 | 6/2017 | Hsu et al. |
| 2018/0189551 | A1 | 7/2018 | Ranganath et al. |
| 2019/0347885 | A1 | 11/2019 | Galley et al. |

FOREIGN PATENT DOCUMENTS

| | | |
|---|---|---|
| CN | 107063252 A | 8/2017 |
| CN | 108133527 A | 6/2018 |
| CN | 207690170 U | 8/2018 |
| JP | H07169000 A | 7/1995 |
| JP | 2009-087041 A | 4/2009 |
| JP | 3164216 U | 11/2010 |
| JP | 2013174486 A | 9/2013 |
| JP | 2018060354 A | 4/2018 |
| WO | 200028484 | 5/2000 |
| WO | 2004034335 | 4/2004 |

OTHER PUBLICATIONS

Cedrone, et al.; Unified Access Design Guide; Cisco; Oct. 18, 2011.
PCT/US2019/047744 Invitation to pay additional fees dated Nov. 25, 2019.
JP Office Action for Japanese Application No. 2021-508282 mailed Jan. 23, 2023.

* cited by examiner

UNIFIED ACCESS CONTROL SYSTEM

CROSS-REFERENCE TO RELATED APPLICATIONS

This application is a divisional of U.S. Non-Provisional application Ser. No. 16/547,318, entitled "UNIFIED ACCESS CONTROL SYSTEM," filed on Aug. 21, 2019, now U.S. Pat. No. 11,100,742, which claims priority from and the benefit of U.S. Provisional Application No. 62/721,721, entitled "UNIFIED ACCESS CONTROL SYSTEM," filed Aug. 23, 2018, each of which is incorporated by reference herein.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Since their inception in the early twentieth century, amusement parks have substantially grown in popularity. To address this increasing demand, amusement parks have been expanding by adding attractions and space. The addition of attractions (e.g., rides, restaurants, shops, and shows) generally provides an amusement park with additional capacity to handle a larger number of guests. However, the additional attractions may also provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. Further, to operate more efficiently, it is often desirable to limit the availability of attractions during low attendance times.

Entrance into park attractions and the amusement parks themselves is often controlled at one or more locations where guests are queued. Indeed, queues at amusement parks may be associated with allowance into an attraction, to purchase entitlements to enter the amusement park and specific parts thereof, to verify guest entitlements, to purchase food and merchandise, and many others. Providing a positive overall experience for amusement park guests entails addressing certain issues related to queuing. Indeed, it is now recognized that park guests can be deterred from returning to a particular amusement park due to negative experiences with queue waiting times and multiple queue locations. Accordingly, improving amusement park queuing systems and methods may result in a more enjoyable and positive experience for amusement park patrons.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
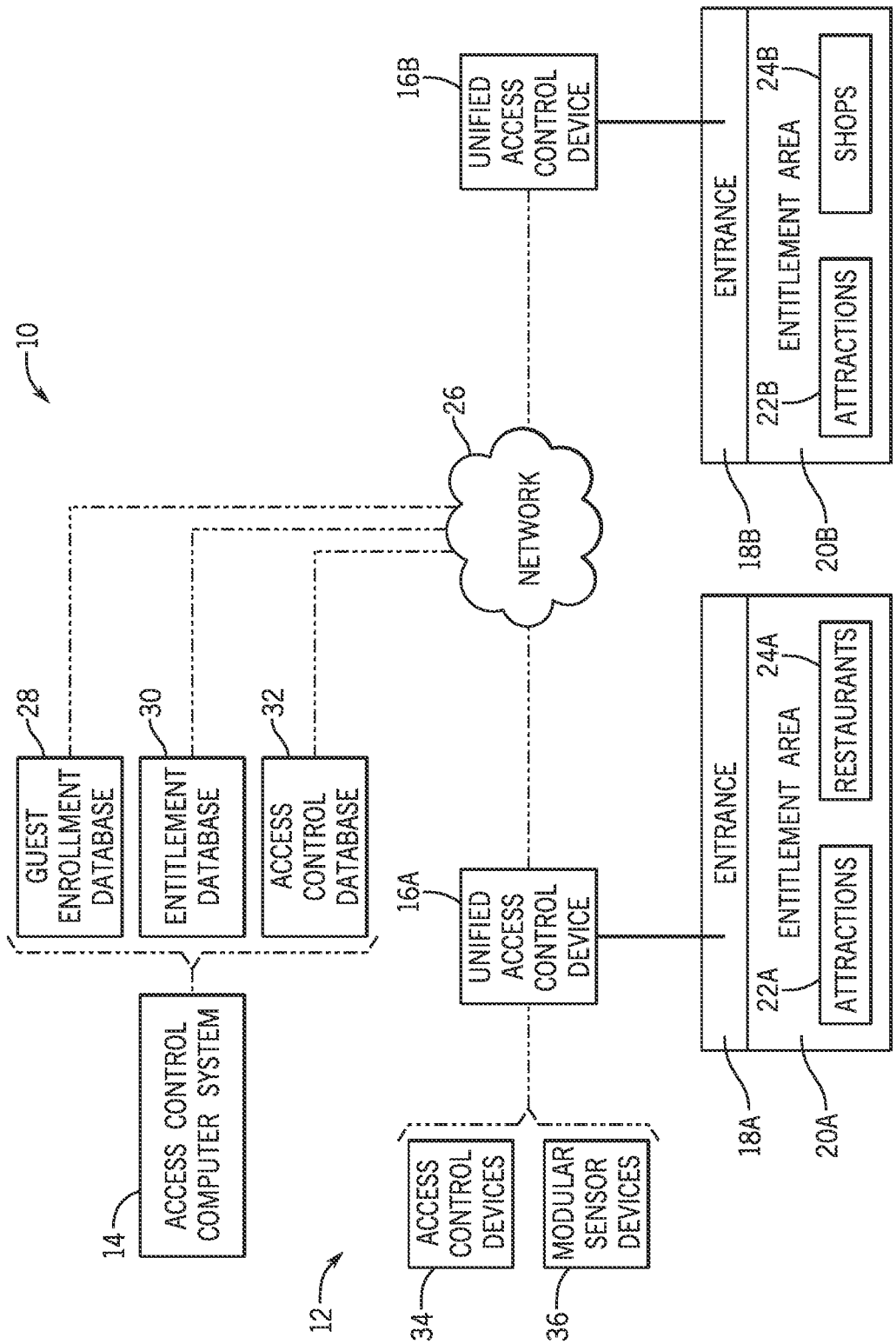
FIG. 1 is a block diagram schematically depicting an embodiment of an amusement park having an access control system with unified access control devices that control entrance into various entitlement areas, in accordance with an aspect of the present disclosure.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To access various areas of amusement parks, guests may be asked to transit through multiple devices and locations. These may include turnstiles, metal detectors, biometric scanners and ticketing, among others. Each device slows down the guest entry into the amusement park and/or sections thereof, and can result in increased frustration levels for guests at various stages of their theme park experiences.

To address these and other shortcomings of traditional approaches, present embodiments provide, among other things, an invisible turnstile experience by combining several guest access control devices (e.g., biometrics (face, finger and iris), ticketing, and metal detection devices) into a single physical device and unified process. The system of guest access control devices may be referred to as a unified access control device. In accordance with such embodiments, algorithmic software stored in the device may receive input (e.g., data indicative of body shapes, faces, fingers, and/or irises) from a variety of sensors, personal mobile device signals, access card signals, and so forth. By continuously evaluating guest identities and entitlements, the unified access control device acts as an invisible turnstile—enabling guests to have appropriate entitlements and experience free-flowing, frictionless entry while continuously evaluating unauthorized access to various amusement park locations.

In accordance with certain embodiments, guests may enroll in the system at home, online or onsite (at the amusement park). Upon enrollment, the unified access control device may perform guest matching and validation via the guest's face, finger, full body scan and iris, or via other features such as a personal electronic device. Accordingly, the unified access control device may readily validate whether guests have appropriate entitlements as the guests pass through a security checkpoint. The system may also allow guests to register and add new entitlements either via a personal mobile device or with the assistance from a team member at a point of park or attraction entry.

The unified access control device may have a modular design to allow for ready transport and deployment in a variety of environments. The modularity of the design also allows addition or removal of all or a portion of the access control devices on demand. For example, the access control device addition or removal may be based on real-time in-park attendance, based on scheduled events (e.g., special events), and so forth. The unified access control device may therefore significantly improve the throughput of guests, reducing guest wait times and improving overall park entry experiences based on the flexibility of installing and removing the unified access control device.

The unified access control devices and systems of the present disclosure may be used in a variety of different settings and locations within and around an amusement park. To help illustrate, FIG. 1 is a schematic depiction of an example embodiment of an amusement park 10 that utilizes an embodiment of a unified access control system 12. As shown, the amusement park 10 includes an access control computer system 14 that coordinates the operation of various unified access control devices 16 (e.g., 16A and 16B) that control guest access into the amusement park 10 and/or to locations within the amusement park 10. More specifically, the access control computer system 14 may include one or more computing devices having processing and memory circuitry that perform various control operations associated with access control, and storing various data that is used during implementation of the techniques described herein.

The access control computer system 14 may be implemented as one or more specially configured server computers that work in combination with unified access control devices 16 that may be positioned at various entrance locations 18 (e.g., 18A and 18B) associated with different sections of the park. In the embodiment of FIG. 1, these different sections of the amusement park 10 are labeled as entitlement areas 20 (e.g., 20A and 20B). The illustrated entitlement areas 20 include respective regions of interest, such as attractions (e.g., rides, show areas, gaming areas) 22 (e.g. 22A and 22B), restaurants 24 (e.g., 24A and 24B), shops, and so forth. The unified access control devices 16 that are positioned at the respective entrances 18 of the entitlement areas 20 generally control guest access through the entrance 18 for each area 20.

Coordination of the unified access control devices 16 and the access control computer system 14 may be accomplished via a network 26. The network 26 may be a wired network including a plurality of Ethernet connections, or may be a wireless network that operates according to any appropriate wireless communication protocol. For instance, the network 26 may be a wireless communication network (e.g., wireless local area network [WLAN], wireless wide area network [WWAN], or near field communication [NFC] network). The network 26 enables communication and coordination between various components of the unified access control devices 16 and the access control computer system 14. Components of the access control computer system 14, as illustrated, may include a guest information or guest enrollment database 28, an entitlement database 30, and an access control database 32. Other components not specifically shown may be included as part of the access control computer system 14, such as workstations that are local to the access control computer system 14, and other databases or computer devices that may facilitate operation of the access control techniques described herein.

The guest enrollment database 28 may include guest enrollment data, such as various identifying information associated with guests. The identifying information may include, by way of example, one or more photographs of the guest, guest associations with other enrolled and/or non-enrolled guests (e.g., families), biometric data, data associated with personal electronic devices of the guest, guest identification numbers, family identification numbers, personal electronic device identification numbers, and so forth. The guest enrollment data may, in certain embodiments, be stored in a manner that facilitates association with other types of data described herein.

One set of such data may be stored by the entitlement database 30, which may include entitlement data that associates various guests with various entitlements, tickets, wrist bands having entitlement data stored thereon, and so forth. Storage of entitlement data may be implemented in a number of different ways. For instance, the entitlement data may be associated with the guest enrollment data and/or with a guest name or other piece of information tied to the guest (e.g., a number or code that is associated with a particular guest). In many situations, certain guests may be associated with a specific entitlement, such as an entitlement associated with entrance into a first entitlement area, but not to a second entitlement area. Further, the entitlement database 30 may associate guests information with areas to which they are not entitled, as described below. The access control database 32 may include various access control algorithms, date associated with historical access for entitlement areas, and the like. In certain embodiments, the access control computer system 14 may associate each identifier associated with a guest (e.g., each instance of guest enrollment data, such as each picture, fingerprint, retinal or iris scan, or other biometric data) with the guest enrollment data for that specific guest. This may allow any one or a combination of sensors, described below, to obtain identifying guest information which can then be used to allow the guest to access a particular entitlement area (or not) in an efficient manner. In other words, direct linkage of the guest enrollment data to the guest entitlement data may, in certain embodiments, reduce the number of processes that the computing devices associated with the access control computer system 14 and/or the unified access control devices 16 may perform, decrease the amount of memory, storage space, and/or networking resources devoted to allow or deny guest access to an entitlement area.

The access control database 32 may store algorithms that execute various access control processes described herein, identifying information relating to each unified access control device 16 (e.g., an internet protocol (IP) address and/or location within the amusement park 10), sensor information associated with each unified access control device 16, identifying information for sensors (e.g., in situations where each sensor is individually addressable), historical data relating to the sensors, maintenance information associated with the sensors, and so forth.

As also illustrated in FIG. 1, the unified access control devices 16 may include a number of different components, such as access control devices 34 and modular sensor devices 36. The access control devices 34 and the modular sensor devices 36, in certain embodiments, may fit or be oriented together in a modular fashion to form a unified structure. The unified structure may take a variety of forms, such as a pole, archway, doorway, and so forth. The modular sensor devices may be configured to sense or collect information indicative of guests the proximate to their location (e.g., at an entrance 18).

The type of information gathered by each modular sensor device 36 may depend on the particular type of sensor device. As described in further detail below, for example, the modular sensor devices 36 may include biometric sensors, facial recognition cameras and associated identification circuitry, metal detectors, wired communication devices, barcode scanners, and so forth.

The modular sensor devices 36 and the access control devices 34 may communicate with one another, and in some situations with the access control computer system 14, such that the access control devices 34 may coordinate operation of the various modular sensor devices 36, and in some situations activate access control based on various control algorithms. The various control algorithms may be run locally at the unified access control devices 16, or remotely at the access control computer system 14, or a combination of both. For example, the access control devices 34 may, in response to receiving certain types of guest identifying information from the modular sensor devices 36, perform access control operations in a number of ways. As one example, the access control devices 34 may perform access control operations by actuating mechanical features that physically block access between different locations (e.g., attractions 22 restaurants 24, or shops). As another example, the access control devices 34 may perform access control operations by relaying a signal to a remote device that in turn signals to a park employee that a particular guest should be directed to an area where the guest can be enrolled and their enrollment associated with one or more specific entitlements.

Figure 2:
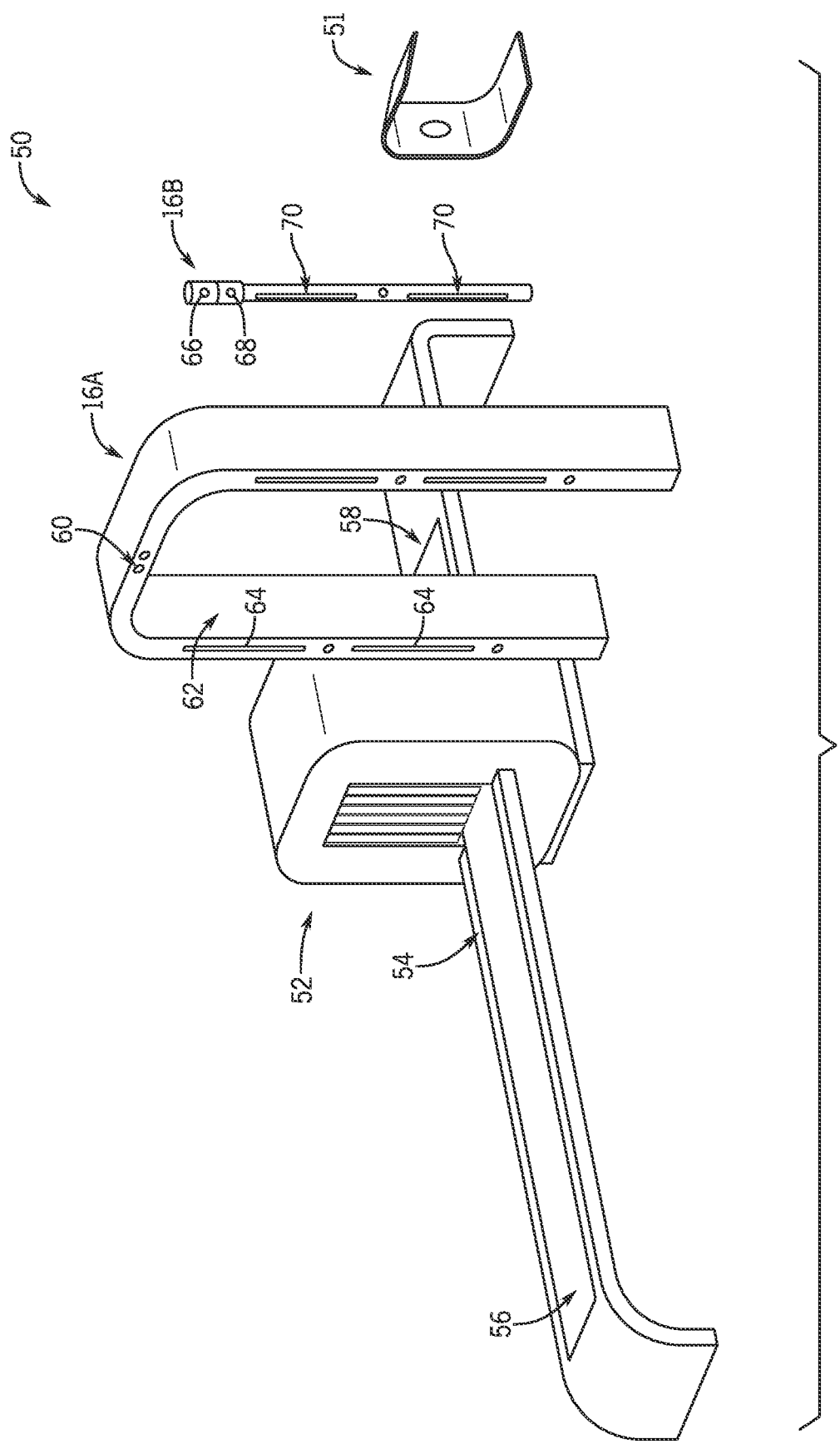
FIG. 2 is a perspective view of an embodiment of an entrance system having multiple unified access control devices, in accordance with an aspect of the present disclosure.

With the foregoing in mind, FIG. 2 is a perspective view of an embodiment of an entrance system that may be associated with an entrance 18 to the amusement park 10 of FIG. 1, the entitlement area 20 of FIG. 1, or the like. The entrance system 50 of FIG. 2 includes various features for screening belongings of a guest, enrollment of guest information into the guest enrollment database 28, determination and validation of guest identity, and verification of guest entitlements. The illustrated entrance system 50 may also include a location 51 (e.g., a kiosk or podium) where an amusement park employee may be located to direct guests to various locations of the park based on outputs generated by control devices of the entrance system 50.

More specifically, the illustrated components of the entrance system 50 include a baggage scanner 52 that may be any appropriate type of device or system that scans baggage for items that are not allowed in the park 10. By way of example, such a scanner 52 may utilize penetrating electromagnetic radiation to produce a view of baggage and what is contained in the baggage. The entrance system 50 also includes a moving belt or conveyor belt 54 that moves baggage or other personal items through the baggage scanner 52.

A first unified access control device 16A is positioned adjacent to the baggage scanner 52 and situated between a loading portion 56 of the conveyor belt 54 and a retrieval portion 58 of the conveyor belt 54. The first unified access control device 16A is illustrated as an arch (which may include or be part of the access control device 34 of FIG. 1) through which guests may pass, and may be referred to as an "enrollment arch" 16A in situations where the entrance system 50 is at an entrance 18 to the amusement park 10. The enrollment arch 16A may be shaped in the form of an arch that enables guests to pass under, and includes a number of integral components that detect information from or relay information to the guests, such as biometric sensors 60, metal detectors 62, as well as biometric enrollment feedback indicators 64. The biometric sensors 60 (e.g., including a facial biometric sensor and/or full body scanners) and the metal detectors 62 may determine or identify information associated with the guests, while the biometric enrollment feedback indicators 64 may provide feedback (e.g., to the guests) indicating some aspect or detail associated with guest enrollment. The enrollment arch 16A may incorporate a number of sensors that include, but are not limited to, the biometric sensors 60 and metal detectors 62. Using these sensors, the enrollment arch 16A may facilitate performing guest enrollment. For example, the enrollment arch 16A may utilize the biometric sensors 60 to scan a guest and perform appropriate enrollment procedures, and once the guest has been enrolled, the feedback indicators 64 may signal accordingly (e.g., by providing confirmation that the guest has been enrolled). It should be understood that, while the first unified access control device 16A in FIG. 2 is depicted as the enrollment arch, the unified access control device 16A (e.g., as referred to in FIG. 1) may include any suitable structure, shape, geometric configuration, dimensional aspects, and so forth.

The feedback relating to guest enrollment may indicate, for example, a state of guest enrollment into the guest enrollment database 28, validation of guest entitlement into the guest enrollment database 28, or the like. More specifically, the feedback indicators 64 may provide or output a validation indication that corresponds to the guest having provided sufficient identifying information—thereby indicating previous enrollment into the system and that no further enrollment processes are required. Alternatively, the feedback indicators 64 may provide or output an indication to the guest to wait while they are being scanned and enrolled. Additionally or alternatively, the feedback indicators 64 may provide a visual and/or audible confirmation that, upon scanning using the biometric sensors 60 or similar features, the guest has been enrolled and may proceed. Moreover, the feedback indicators 64 may provide any other suitable indications to the guest, such as that the guest requires further enrollment to participate in park activities.

In the illustrated embodiment of FIG. 2, a second unified access control device 16B is positioned beyond the enrollment arch 16A. In certain embodiments, the second unified access control device 16B performs entitlement validation. The second unified access control device 16B as illustrated includes a full-body biometric sensor 66. The second unified access control device 16B also includes multifactor sensors 68, which may include, by way of example, sensors that are able to collect information relating to the guest's hands, eyes, or other physical features. Additionally or alternatively, the multifactor sensors 68 may identify electronic devices associated with guests (e.g., smartphones, wearable devices, or park entry bracelets that have embedded electronic devices or identification tags), tickets carried by guests, and so forth.

The second unified access control device 16B also includes entitlement validation feedback indicators 70. The entitlement validation feedback indicators 70 may provide appropriate indications when a guest has been properly enrolled and/or when the guest's enrollment information corresponds to or matches with an entitlement to enter the park. For example, the second unified access control device 16B may include internal control circuitry that queries the guest enrollment database 28 and/or the guest entitlement database 30 of the access control computer system 14 to determine whether a guest's identified information is associated with an appropriate entitlement. The control circuitry may then activate one or more of the visual and/or audible feedback indicators (e.g., of the entitlement validation feedback indicators 70) as appropriate. Accordingly, an amusement park employee positioned at a remediation podium 51 located proximate to the second unified access control device 16B may direct the guest either toward attractions 22 or entitlement areas 20 of the amusement park 10 or to another location of the amusement park 10 where the guest may purchase entitlements in order to access sections of the park 10.

Figure 3:
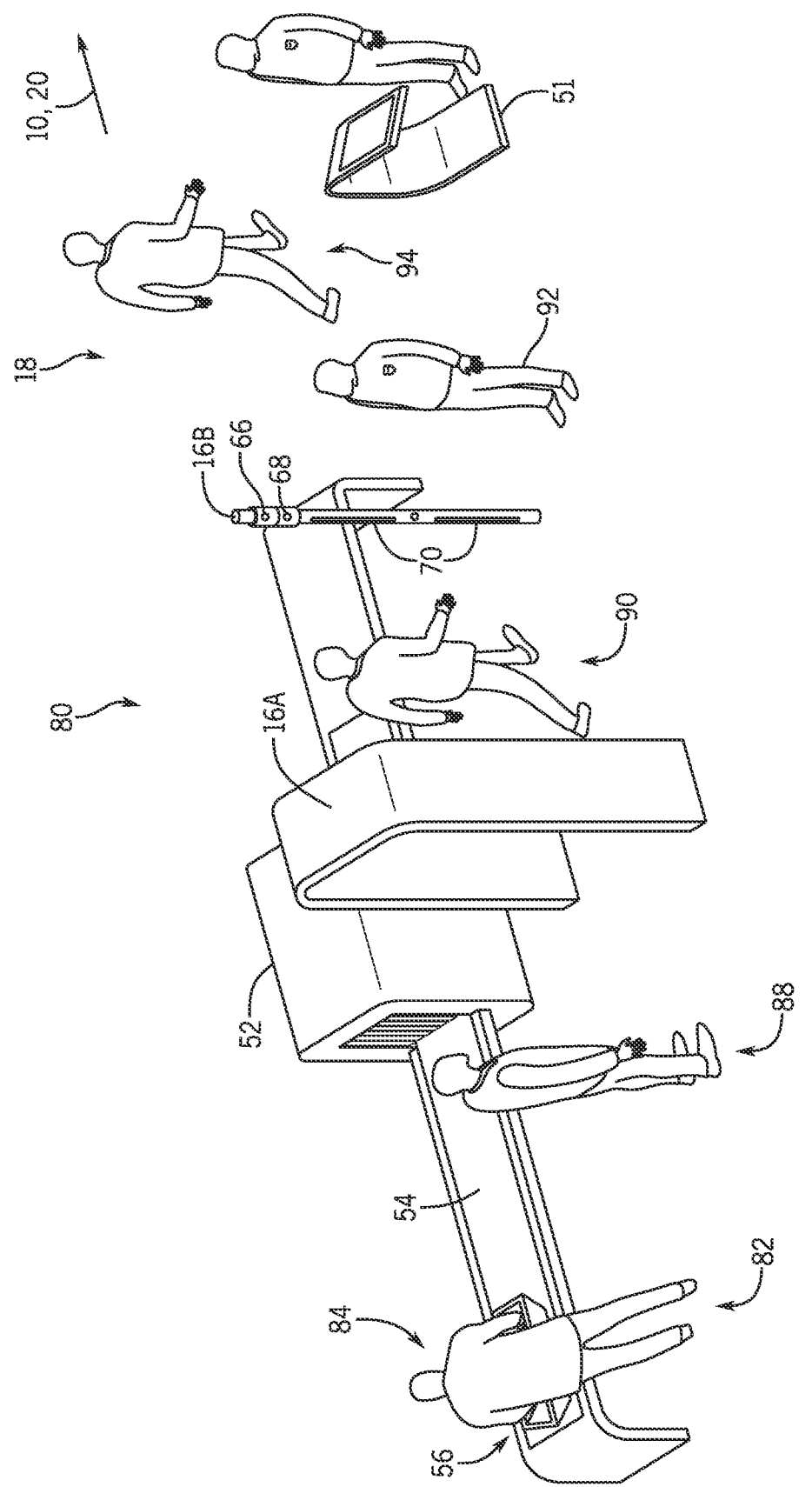
FIG. 3 is a perspective view of an example scenario in which a guest with an entitlement to enter the amusement park proceeds through the entrance system of FIG. 2, in accordance with an aspect of the present disclosure.
Figure 4:
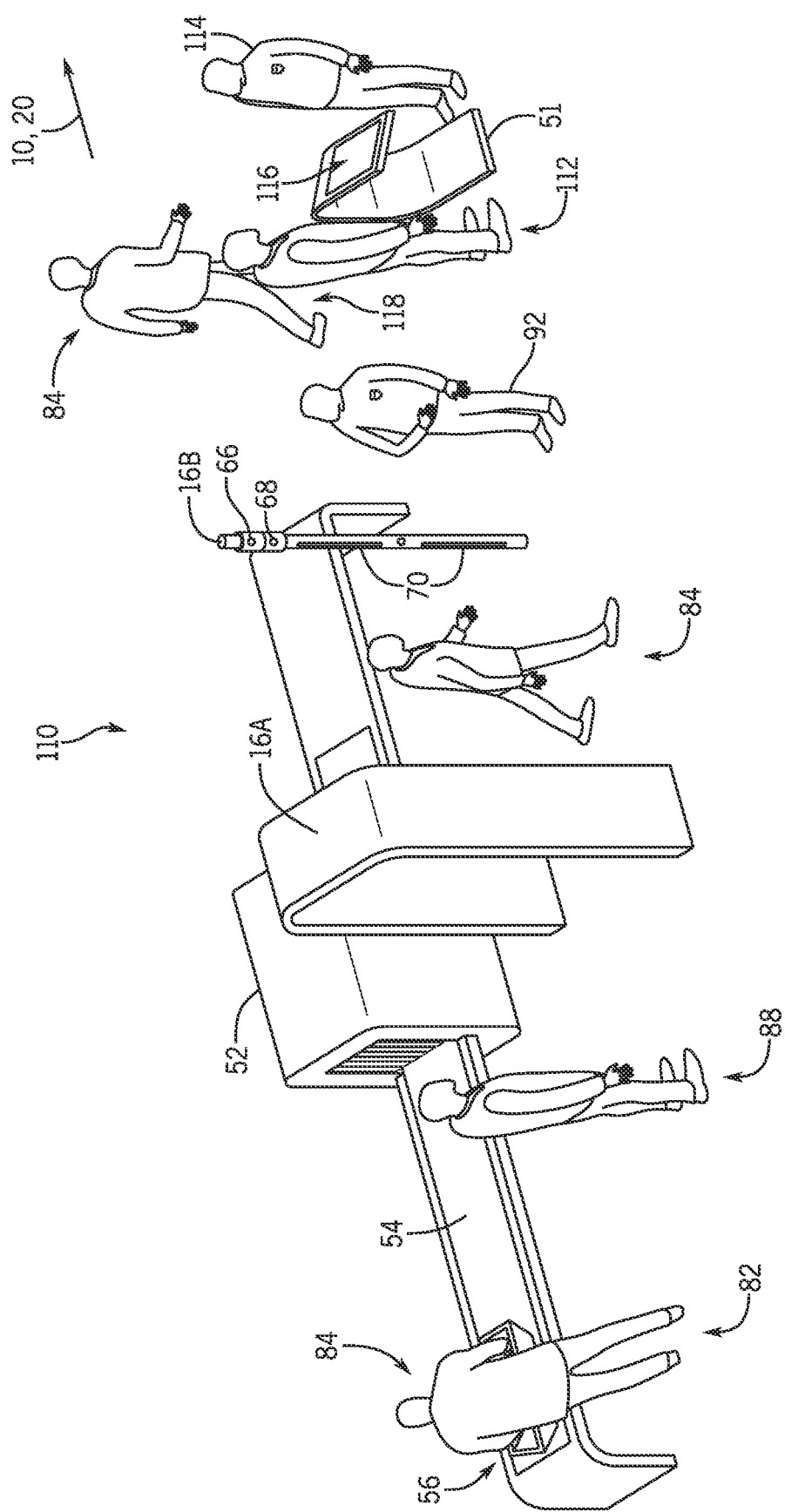
FIG. 4 is a perspective view of another example scenario in which a guest proceeds through the entrance system of FIG. 2 and is identified by a unified access control device as not having an entitlement to enter the amusement park, in accordance with an aspect of the present disclosure.

FIGS. 3 and 4 each depict an example of the manner in which a guest may progress through the entrance system 50, go through enrollment and entitlement validation, and proceed through the entrance 18 in a manner dependent on the operation of the various access control devices 16. Specifically, in the example 80 of FIG. 3, at a first step 82, a guest 84 approaches security at the entrance 18 (e.g., to the amusement park 10) and places their belongings onto the loading portion 56 of the moving belt 54. The guest 84, while their belongings are being scanned by the baggage scanner, has their face and body scanned while walking through the enrollment arch 16A at a second step 88. At this point, the first unified access control device (the enrollment arch) 16A scans the guest's face and body and enrolls their biometric profile.

The guest 84 then passes through the first unified access control device 16A at a third step 90, which may include scanning for metal objects, and the second unified access control device 16B performs validation of the guest's entitlements. For instance, the full-body biometric sensor 66 of the second unified access control device 16B may scan the guest, determine the guest's identifying information, and compare the identifying information with the stored information that was enrolled in the second step 88 as well as entitlement information stored in the entitlement database 30. The second unified access control device 16B may also determine that the guest's entitlement is validated in response to determining that the guest's identifying information, as scanned, matches the enrollment information (stored in, for instance, the enrollment database 28) and/or determining that the enrollment information is associated with an entitlement to enter the amusement park 10. The second unified access control device 16B may then produce a visual indication that the entitlement is valid. For instance, the indication may include output of a portion of the indicators of the second unified access control device 16B (e.g., the enrollment feedback validation indicators 70), such as outputting a green light or displaying a checkmark.

In certain situations, the visual indication may be intended for a park employee and not for perception by surrounding guests. Accordingly, there may be a first park employee (e.g., 92) who watches the entitlement validation indicator 70 to determine how the guest 84 should proceed (e.g., go into the amusement park 10 or be directed to the remediation podium 51). In other embodiments, there may not be a human employee, but instead one or more devices that instruct the guest 84 to proceed in a particular manner and/or physically block the guest 84 from proceeding. For example, there may be a display with text and/or graphics that instructs the guest to proceed to a certain location. In a fourth step 94, because the enrollment has been validated and the enrollment feedback validation indicators 70 have lit green, the guest 84 collects their belongings and heads toward an entitlement area 20 of the amusement park 10.

In the example 110 illustrated in FIG. 4, the first and second steps 82, 88 proceed as described with respect to the example 80 of FIG. 3. However, once the guest 84 has proceeded through the enrollment arch 16A, the second unified access control device 16B determines that, in this case, the guest's entitlement is not found or is invalid. In response to this determination, a portion of the second unified access control device 16B (e.g., the enrollment feedback validation indicator 70) provides a different indication than the indication described in the example 80 of FIG. 3. For example, the feedback indicators 70 on the second unified access control device 16B may light red or display an "X", or there may be some other visual or audible indication provided to a park employee (e.g., 92) that the guest 84 should proceed toward a podium (e.g., 51), as shown in a fourth step 112. At the podium 51, a park employee 114 may have access to a remediation device 116. The remediation device 116 may enable the park employee 114 to associate the guest's identifying information with one or more particular entitlements. In some cases, such as when associating the guest's identifying information with one or more particular entitlements fails, the guest 84 may be directed to a ticketing location where they can purchase additional entitlements. Once the guest 84 performs these actions, the guest 84 may then, as shown in a fifth step 118, proceed to various entitlement areas 20 of the amusement park 10.

Figure 5:
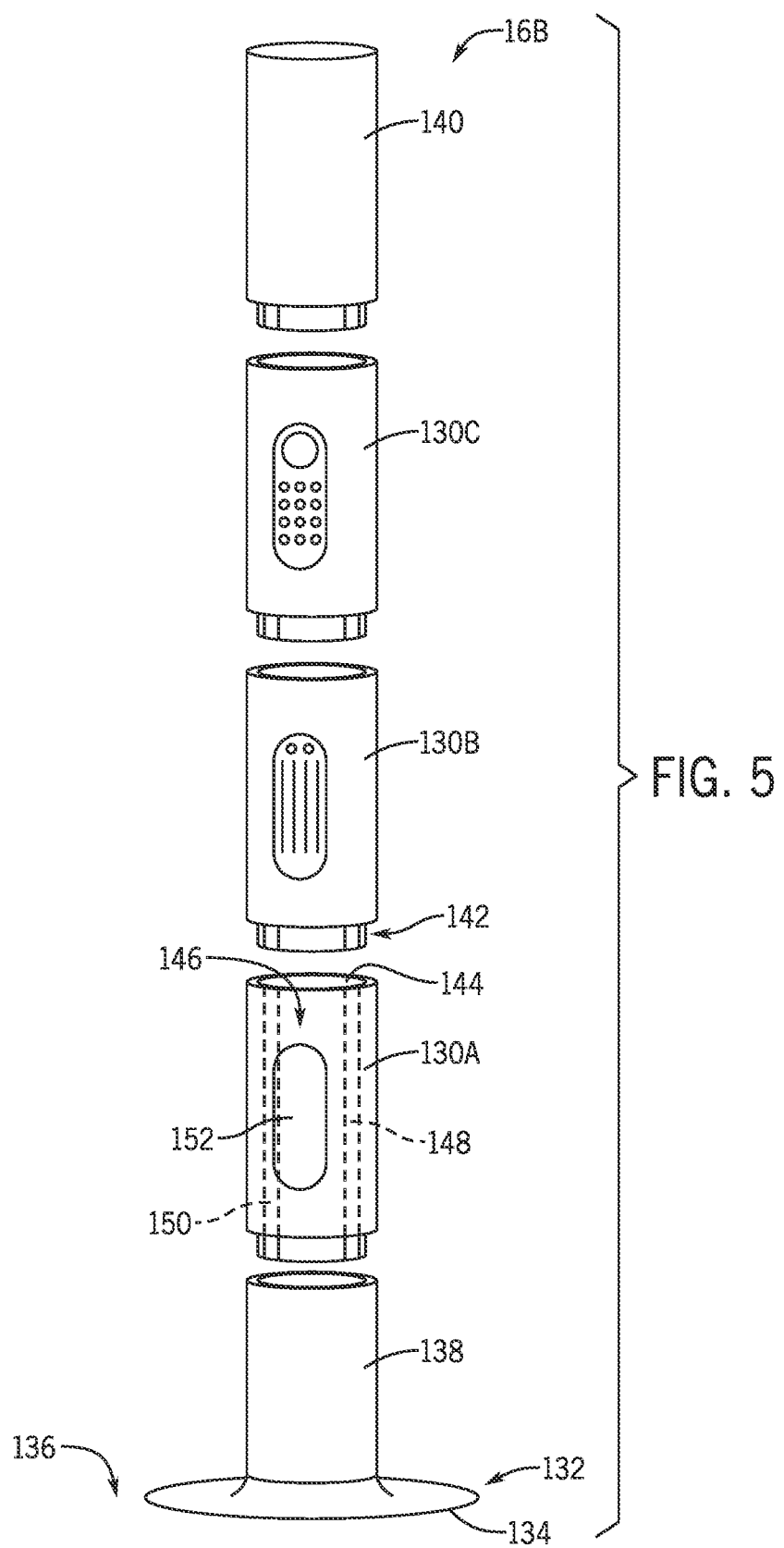
FIG. 5 is an exploded perspective view of an embodiment of a unified access control device, in accordance with an aspect of the present disclosure.

FIG. 5 is an exploded perspective view of an example embodiment of the unified access control device 16B. Specifically, FIG. 5 depicts various components of the unified access control device 16B and how these components may physically and communicatively couple with one another. The illustrated unified access control device 16B includes multiple modular components that generally fit together to form a unified structure having a particular geometric configuration. As shown, the geometric configuration of the unified access control device 16B in FIG. 5 is a pole or cylinder (which may include or be part of the access control device 34 of FIG. 1). However, in other embodiments the geometric configuration may be any other shape that can be integrated into a themed entrance area 18 associated with an amusement park 10. In this respect, one aspect of certain embodiments of the unified access control devices 16 may be that they can readily be integrated into the theme of a particular amusement park attraction 22, which may generally correspond to camouflaging of the access control devices 16. This particular aspect of the unified access control devices 16 may be desirable for a more immersive and seamless experience between attractions 22, which is in contrast with typical configurations where access control devices are readily seen and clearly delineate areas (e.g., 20) from one another. It should be understood that the structure, geometric configuration, shape, dimensional aspects, and so on, of the unified access control devices 16 may include or be part of the access control device 34 of FIG. 1. Moreover, while the second unified access control device 16B in FIGS. 2-5 is depicted as a pole or cylinder, it should be understood that the unified access control device 16B (e.g., as referred to in FIG. 1) may include any suitable structure, shape, geometric configuration, dimensional aspects, and so forth.

The components of the unified access control device 16B generally include one or more sensor modules 130 (which may include or be part of the modular sensor devices 36 of FIG. 1) that determine guest identification information, which may correspond to facial recognition information, body shape information, iris information, fingerprint information, or other information relating to the guest's anatomical structure. Additionally or alternatively, the unified access control device 16B may incorporate sensor modules 130 that scan items that may be associated with guest entitlement information. Such items may include a wristband having a chip storing entitlement information, a ticket having a barcode or Quick Response (QR) code with encoded entitlement information, and the like. Further, certain sensor modules 130 may incorporate communication devices configured to communicate with a personal electronic device of the guest 84, such as a tablet, smartphone, or similar device.

The illustrated components include a base 132, which includes a mount 134 that attaches to a surface 136 or other structure, such as a floor, a ceiling, or a wall. In other embodiments, the mount 134 may simply rest on the ground. The mount 134 may also include a port that receives power and/or data transmission lines. The base 132 may also include a base module or access control module 138 coupled to the mount 134. The access control module 138 may incorporate processing and memory components that enable coordination of the operation of the other modular components (e.g., the sensor modules 130) of the unified access control device 16B. For example, the access control module 138 may incorporate a local control system having appropriately configured control circuitry (e.g., in the form of one or more processors and one or more memory devices) that controls operation of the unified access control device 16B (e.g., by having the one or more processors execute machine-readable instructions stored in the one or more memory devices). The local control system may also include communication circuitry that communicates with the access control computer system 14. As such, the local control system disposed in the or access control module 138 (or in an alternative component of the unified access control device 16B) may perform queries of and write data to the guest enrollment database 28 and/or the entitlement database 30, and/or perform algorithms, update data, or the like, at the access control database 32. In alternative or additional embodiments, the access control module 138 may be separate from the base module 138, and, as such, may be located as a separate module in any suitable position relative to the modules of the unified access control device 16B, such as between sensor modules 130 (e.g., 130A, 130B, and 130C) or near the top of the unified access control device 16B (e.g., adjacent to a cap module 140). Thus, in such embodiments, the base module 138 may not include the processing and memory components or the local control system of the access control module.

In the illustrated embodiment, the base module 138 is positioned at a first end of the unified access control device 16B, opposite from the cap module 140. The cap module 140 may generally seal off the interior components of the unified access control device 16B. In certain embodiments, the cap module 140 may incorporate various components such as antennas, wireless communication devices, or other similar features.

The sensor modules 130 of the unified access control device 16B illustrated in FIG. 5 include a first sensor module 130A, a second sensor module 130B, and a third sensor module 130C positioned between the base module 138 and the cap module 140. These various modules 130 may fit together in a variety of ways. However, in the illustrated embodiment, each modular component (including the sensor modules 130) includes a male connector 142 and a female connector 144. The male connector 142 and the female connector 144 may include physical features that are complementary to one another to enable secure connection between the various modular components (e.g., via an interference fit or a snap fit).

Further, the modular components 130 may include various features that enable communication and power transmission. As shown specifically at the first sensor module 130A, the physical structure of the sensor modules 130 may include a housing 146, a communication bus 148 extending through the housing 146, and a power bus 150 extending through the housing 146. The communication bus 148 and/or the power bus 150 may be integrated within the housing 146 of the various modular components 130, or may be exposed. However, in accordance with certain embodiments, the communication bus 148 and the power bus 150 of each modular component 130 may be exposed at least at respective male connector 142 and female connector 144 to enable ready connection between the different modular components 130. Present embodiments provide for efficient assembly, disassembly, maintenance, and customization of the unified access control device 16B. The linear arrangement of modules (e.g., modular components 130), the vertical stacking, simple communications interfaces, and so forth, provide these efficiency benefits over traditional techniques.

By way of non-limiting example, the first sensor module 130A may include a first sensor 152, which may include any one or a combination of various communication devices, such as near field communication devices. As an example implementation, the first sensor 152 may to communicate with personal electronic devices of guests 84 and/or wearable features that incorporate stored entitlement information such as a wristband.

The second sensor module 130B may include another type of sensor that is different from the sensor or sensors 152 of the first sensor module 130A. Indeed, in accordance with present embodiments, the sensor components (e.g., 152) of the unified access control device 16B may be mixed and matched based on a particular set of requirements associated with, for example, the location at which the unified access control device 16B is to be deployed. For example, if an entrance system 50, such as that shown in FIG. 2, incorporates a certain type of detector, the unified access control device 16B may not necessarily incorporate that type of detector if redundancy is not desired at controlled access areas within the park 10. If redundancy is desired, multiple sensor modules 130 of the same type may be used in the same unified access control device 16B.

By way of example, the second sensor module 130B may include voice recognition technology such as a microphone and associated voice recognition circuitry that enables matching between received voice data and stored voice data associated with the guest 84. Additionally or alternatively, the second sensor module 130B may incorporate a series of feedback indicators (e.g., 70), such as lights (e.g., light emitting diodes (LEDs)) that provide visual feedback in response to various validation procedures performed by the unified access control device 16B.

The third sensor module 130C may incorporate a third type of sensor or a third set of sensors different than the first and second sensor modules 130A, 130B. By way of example, the third sensor module 130C may include various biometric sensors, such as a camera and associated facial recognition control circuitry. Any type of biometric sensors or facial recognition systems may be utilized in accordance with the present disclosure. As will be appreciated, the unified access control device 16B therefore incorporates a number of different sensor types into one unified structure that may communicatively couple with an access control module or the base module 138 and identify guest information, compare that information to stored guest information to identify entitlements associated with the identified guest 84, and provide feedback indicating whether the guest 84 is clear to enter a particular area (e.g., 20).

In accordance with present embodiments, guests 84 in any particular entrance area 18 may be scanned by the unified access control device 16 associated with that area 18. In certain situations, this may result in all guests 84 in a particular entrance area 18 being scanned. Following this scanning, their information may then be compared against stored guest enrollment and entitlement data. However, it should be noted that in certain amusement park locations the number of people that may be present in a particular entrance area 18 may be relatively large. That is, there may be a very large number of people to scan, and subsequently validate their entitlement information. These computer-implemented procedures may be processor-intensive at large scales, and accordingly it may be desirable to reduce the amount of resources allocated to guest scanning and entitlement validation by controlling the manner in which guests 84 are scanned and their entitlements validated at different locations throughout the amusement park 10.

Figure 6:
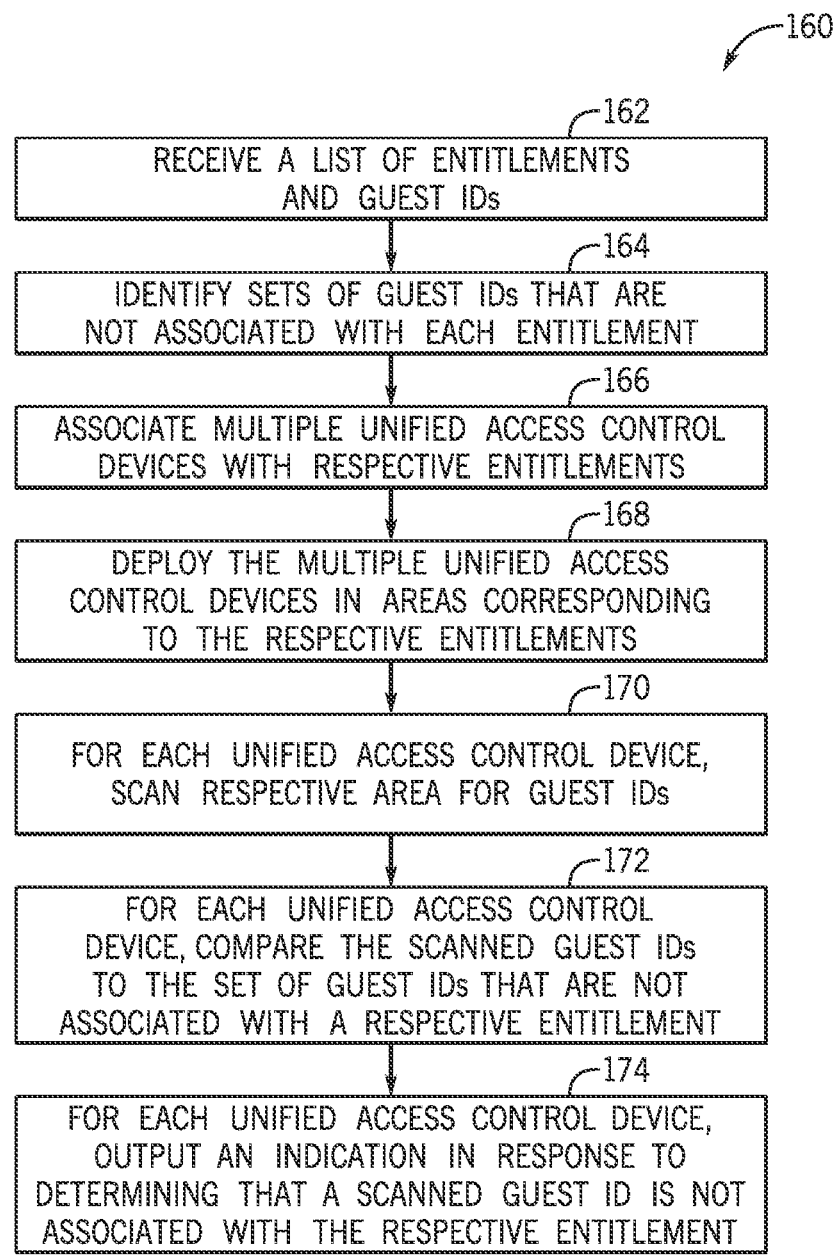
FIG. 6 is a process flow diagram depicting an embodiment of a method of controlling guest access through an entrance by performing targeted scanning, in accordance with an aspect of the present disclosure.

It is now recognized that it may be desirable to increase the efficiency by which a unified access control device 16 of the present disclosure may scan guests 84 to validate entitlement information and provide meaningful feedback to control the flow of guests 84 throughout the park 10. FIG. 6 is a process flow diagram of a method 160 of controlling entrance into an amusement park area (e.g., 20) using a unified access control device 16 of the present disclosure. The method 160 may be performed by a combination of the access control computer system 14 and one or more unified access control devices 16.

Generally, the method 160 involves comparing guest identifiers of guests 84 to a set of guest identifiers that are not associated with an entitlement in a particular area (e.g., 20), rather than querying all information associated with every guest identifier of every guest 84, and validating entitlement information. In the first operation of the method 160, shown as operation 162, the system, such as the access control computer system 14, may receive a list of entitlements and guest-identifying information (e.g., biometric data, personal electronic device data). Additionally or alternatively, the unified access control device 16 may receive a list of entitlements and the guest identifiers.

At operation 164, the system 14 may then identify or determine those guest identifiers (e.g., a set of guest identifiers) that are not associated with each entitlement. That is, for particular entitlements, a list is generated of guest identifiers that are not associated with each entitlement. Thus, each unified access control device 16, being associated with a particular entitlement, only scans for the guest identifiers that are not associated with that particular entitlement, rather than querying all information associated with every guest identifier of every guest 84, regardless of entitlement status, and validating entitlement information.

To this end, the method 160 also includes, as shown at operation 166, that multiple unified access control devices 16 are associated with respective entitlements. Referring to the unified access control system 12 shown in FIG. 1 for example, there is a unified access control device 16A associated with entitlement area 20A and there is a different unified access control device 16B associated with entitlement area 20B. This positioning may correspond to operation 168, which includes deployment of the multiple unified access control devices 16 in areas (e.g., 20) corresponding to the respective entitlements of those unified access control devices 16. Alternatively, a unified access control device 16 may be positioned at a particular location, and its associated entitlements may be updated upon deployment.

At operation 170, the method 160 includes scanning a respective area for guest identifying data of guests 84 in that area. By way of example and returning again to FIG. 1, the unified access control device 16A associated with entitlement area 20A would scan guests 84 in that entrance area 18 and receive their guest identifiers. Similarly, the unified access control device 16B associated with entitlement area 20B would scan guests 84 in that entrance area 18B and receive their guest identifiers.

At operation 172, the method 160 includes comparing the scanned guest identifiers to the list or set of guest identifiers that are no associated with a respective entitlement. In the example of FIG. 1, and the unified access control device 16A associated with entitlement area 20A may compare its scanned guest identifiers to the list of guest identifiers (e.g., as generated in operation 164) that are not associated with that entitlement of entitlement area 20A. Similarly, the unified access control device 16B associated with entitlement area 20B would compare its scanned guest identifiers to the list of guest identifiers that are not associated with the entitlement of entitlement area 20B. Advantageously, the unified access control devices 16 may avoid having to compare the scanned guest identifiers to an entire list of all guest identifiers, which may be much larger and more extensive than the list of guest identifiers that are not associated with a respective entitlement. It is recognized that performing this targeted scanning method may reduce the processing load associated with controlling access to various entitlement areas 20 by reducing the amount of information that must be processed by the unified access control device 16 and the access control computer system 14.

The method 160 of FIG. 6 also includes outputting indications in response to identifying or determining guests 84 that are not associated with the corresponding entitlement at operation 174. For example, the unified access control device 16 scans an entrance area 18, identifies those guests 84 who do not have an entitlement to enter a park area (e.g., 20) associated with the entrance area 18, and provides an indication that a guest 84 does not have an entitlement to enter the park area 20 in accordance with operation 174 in response to identifying one such guest 84. The indication provided may be a physical blockage (e.g., by automatically locking a gate) of an entrance path for the identified guest 84, or may a more subtle indication that is not perceivable to the guest 84 or surrounding guests, but is provided to an amusement park employee (e.g., via a handheld electronic device such as a tablet) so that the employee may direct the guest 84 to an appropriate location. Additionally or alternatively, the indication may be a visual and/or auditory effect produced at the unified access control device 16 (e.g., a tone or illuminated light), or may be the activation of a connected show effect. Thus, while guests 84 of the park 10 may perceive that the tone, illuminated light, or show effect may be an integral part of the theme of an attraction 22, an amusement park employee may recognize the indication as being indicative of a guest entitlement issue and perform appropriate actions accordingly.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of controlling access into an amusement park, the method comprising:
    receiving a plurality of entitlements associated with the amusement park and a plurality of guest identifiers;
    determining a set of guest identifiers of the plurality of guest identifiers that is not associated with an entitlement of the plurality of entitlements;
    determining a unified access control device of a plurality of unified access control devices of the amusement park that is associated with the entitlement; and
    scanning, via the unified access control device, an area of the amusement park associated with the entitlement for the set of guest identifiers.

2. The method of claim 1, comprising, outputting, by the unified access control device, an indication that a guest does not have the entitlement based on the guest being associated with a guest identifier of the set of guest identifiers.

3. The method of claim 1, wherein the unified access control device comprises sensor modules.

4. The method of claim 3, wherein the sensor modules comprise a biometric sensor.

5. The method of claim 4, comprising receiving, by the sensor modules, anatomical feature data from guests and determining guest identification information based on the anatomical feature data.

6. The method of claim 3, comprising scanning, with the sensor modules, items associated with guest entitlement information.

7. The method of claim 1, wherein the unified access control device comprises an access control module.

8. The method of claim 7, comprising controlling additional components of the unified access control device via processing and memory components of the access control module.

9. The method of claim 7, comprising communicating with an access control computer system via processing and memory components of the access control module.

10. One or more tangible, non-transitory, computer-readable media comprising instructions that, when executed, are configured to cause one or more processors to:
    receive a plurality of entitlements associated with an amusement park and a plurality of guest identifiers;
    determine a set of guest identifiers of the plurality of guest identifiers that is not associated with an entitlement of the plurality of entitlements;
    determine a unified access control device of a plurality of unified access control devices of the amusement park that is associated with the entitlement; and
    manage or initiate scanning, via the unified access control device, an area of the amusement park associated with the entitlement for the set of guest identifiers.

11. The one or more tangible, non-transitory, computer-readable media of claim 10, wherein the instructions, when executed, are configured to cause the one or more processors to output, via the unified access control device, an indication that a guest does not have the entitlement based on the guest being associated with a guest identifier of the set of guest identifiers.

12. The one or more tangible, non-transitory, computer-readable media of claim 10, wherein the unified access control device comprises sensor modules.

13. The one or more tangible, non-transitory, computer-readable media of claim 12, wherein the sensor modules comprise a biometric sensor.

14. The one or more tangible, non-transitory, computer-readable media of claim 13, wherein the instructions, when executed, are configured to cause the one or more processors to receive anatomical feature data from guests and determine guest identification information based on the anatomical feature data.

15. The one or more tangible, non-transitory, computer-readable media of claim 12, wherein the instructions, when executed, are configured to cause the one or more processors to control operations of the sensor modules, and wherein the operations of the sensor modules include scanning items associated with guest entitlement information.

16. The one or more tangible, non-transitory, computer-readable media of claim 10, wherein the unified access control device comprises an access control module.

17. The one or more tangible, non-transitory, computer-readable media of claim 16, wherein the instructions, when executed, cause the one or more processors to control operations of the access control module, additional components of the unified access control device, or both.

18. An electronic device, comprising:
    one or more processors; and
    a memory storing instructions that, when executed by the one or more processors, cause the one or more processors to:
        receive a plurality of entitlements associated with an amusement park and a plurality of guest identifiers;
        determine a set of guest identifiers of the plurality of guest identifiers that is not associated with an entitlement of the plurality of entitlements;
        determine a unified access control device of a plurality of unified access control devices of the amusement park that is associated with the entitlement; and
        cause the unified access control device to scan an area of the amusement park associated with the entitlement for the set of guest identifiers.

19. The electronic device of claim 18, wherein the instructions, when executed, cause the one or more processors to cause the unified access control device to output an indication that a guest does not have the entitlement based on the guest being associated with a guest identifier of the set of guest identifiers.

20. The electronic device of claim 18, wherein the instructions cause the one or more processors to determine a second unified access control device of the plurality of unified access control devices that is not associated with the entitlement, wherein the second unified access control device is associated with another area of the amusement park different from the area.

\* \* \* \* \*